United States Patent
Laino et al.

(10) Patent No.: US 11,016,965 B2
(45) Date of Patent: May 25, 2021

(54) GRAPHICAL USER INTERFACE FOR DEFINING ATOMIC QUERY FOR QUERYING KNOWLEDGE GRAPH DATABASES

(71) Applicant: International Business Machines Corporation, Armonk, NY (US)

(72) Inventors: Teodoro Laino, Rueschlikon (CH); Riccardo Petraglia, Bern (CH); Valery Weber, Gattikon (CH); Federico Zipoli, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 16/253,906

(22) Filed: Jan. 22, 2019

(65) Prior Publication Data

US 2020/0233860 A1    Jul. 23, 2020

(51) Int. Cl.
  *G06F 16/00*   (2019.01)
  *G06F 16/242*  (2019.01)
  *G06F 16/901*  (2019.01)
  *G06F 3/0482*  (2013.01)
  *G06F 16/248*  (2019.01)
  *G06F 16/245*  (2019.01)

(52) U.S. Cl.
  CPC ........ *G06F 16/2428* (2019.01); *G06F 3/0482* (2013.01); *G06F 16/245* (2019.01); *G06F 16/248* (2019.01); *G06F 16/9024* (2019.01)

(58) Field of Classification Search
  CPC combination set(s) only.
  See application file for complete search history.

(56) References Cited

U.S. PATENT DOCUMENTS

| | | |
|---|---|---|
| 5,421,008 A | 5/1995 | Banning et al. |
| 5,426,781 A | 6/1995 | Kaplan et al. |
| 5,428,776 A | 6/1995 | Rothfield |
| 5,721,900 A | 2/1998 | Banning et al. |
| 5,950,190 A | 9/1999 | Yeager et al. |

(Continued)

OTHER PUBLICATIONS

Barcelo, P., "Querying Graph Databases", PODS' 13, Jun. 22-27, 2013, 13 pages.

(Continued)

*Primary Examiner* — Farhan M Syed
(74) *Attorney, Agent, or Firm* — Scully Scott Murphy & Presser, P.C.; Daniel P. Morris

(57) ABSTRACT

Querying a knowledge graph database in which entity data characterizes entities represented by nodes, interconnected by edges, of a knowledge graph, and each edge represents one of a set of relationships between entities which is applicable to the entities represented by nodes interconnected by that edge. A graphical user interface for display by a user computer enables definition, in response to user input, of an atomic query which is associated with a floating graphical query object in the interface. The atomic query defines an input set of said nodes for the query, a relationship and an output set of nodes for the query. Graphical connector and graphical logical-operator objects in the interface are manipulatable by a user in relation to a plurality of the query objects to define a complex query by constructing a graphical representation of a desired logical combination of the query objects.

20 Claims, 9 Drawing Sheets

(56) References Cited

U.S. PATENT DOCUMENTS

| | | | |
|---|---|---|---|
| 5,966,695 A | 10/1999 | Melchione et al. | |
| 6,947,928 B2* | 9/2005 | Dettinger | G06F 16/3322 |
| 7,383,513 B2* | 6/2008 | Goldberg | G06F 16/2428 |
| | | | 715/763 |
| 7,800,613 B2* | 9/2010 | Hanrahan | G06T 11/206 |
| | | | 345/440 |
| 8,103,654 B2* | 1/2012 | Gilula | G06Q 30/0257 |
| | | | 707/713 |
| 8,312,039 B2* | 11/2012 | Gilula | G06Q 30/0603 |
| | | | 707/769 |
| 8,375,014 B1* | 2/2013 | Brocato | G06F 16/213 |
| | | | 707/705 |
| 8,510,327 B2* | 8/2013 | Boguraev | G16H 70/00 |
| | | | 707/769 |
| 8,656,255 B1 | 2/2014 | Nemazie et al. | |
| 8,667,002 B2* | 3/2014 | Gilula | G06Q 30/0257 |
| | | | 707/765 |
| 8,806,293 B2 | 8/2014 | Tiziani et al. | |
| 8,862,631 B2* | 10/2014 | Trinon | G06Q 10/067 |
| | | | 707/803 |
| 8,972,440 B2* | 3/2015 | Boguraev | G06F 16/2455 |
| | | | 707/769 |
| 9,798,748 B2* | 10/2017 | Brocato | G06F 16/213 |
| 10,769,142 B2* | 9/2020 | Chen | G06F 16/9024 |
| 2005/0004911 A1* | 1/2005 | Goldberg | G06F 16/2428 |
| 2005/0015363 A1* | 1/2005 | Dessloch | G06F 16/2428 |
| 2005/0015364 A1* | 1/2005 | Payton | G06F 16/2423 |
| 2005/0015368 A1* | 1/2005 | Payton | G06F 16/284 |
| 2005/0102613 A1 | 5/2005 | Boukouvalas et al. | |
| 2006/0161466 A1* | 7/2006 | Trinon | G06Q 10/06 |
| | | | 705/7.29 |
| 2009/0006348 A1* | 1/2009 | Gilula | G06F 16/2428 |
| 2009/0182636 A1* | 7/2009 | Gilula | G06Q 30/0269 |
| | | | 705/14.66 |
| 2012/0089630 A1* | 4/2012 | Gilula | G06Q 30/0256 |
| | | | 707/765 |
| 2013/0151572 A1* | 6/2013 | Brocato | G06F 16/2425 |
| | | | 707/805 |
| 2015/0127632 A1 | 5/2015 | Khaitan et al. | |
| 2018/0081936 A1* | 3/2018 | Chen | G06F 16/9024 |
| 2018/0300425 A1* | 10/2018 | Azmi | H04L 67/1002 |
| 2019/0179858 A1* | 6/2019 | Douze | G06F 16/951 |
| 2020/0073879 A1* | 3/2020 | Grabau | G06N 3/0427 |
| 2020/0233860 A1* | 7/2020 | Laino | G06F 16/2428 |

OTHER PUBLICATIONS

Domenjoud, M., et al., "Graph databases: an overview", OCTO Talks!, http://blog.octo.com/en/graph-databases-an-overview/, Jul. 12, 2012, Accessed on Jan. 22, 2019, 12 pages.

Schumacher, R., "A Quick Primer on Graph Databases for RDBMS Professionals", www.datastax.com/2016/07/quick-primer-on-graph-databases-for-rdbms-professionals, DataStax, Jul. 25, 2016, Accessed on Jan. 22, 2019, 6 pages.

* cited by examiner

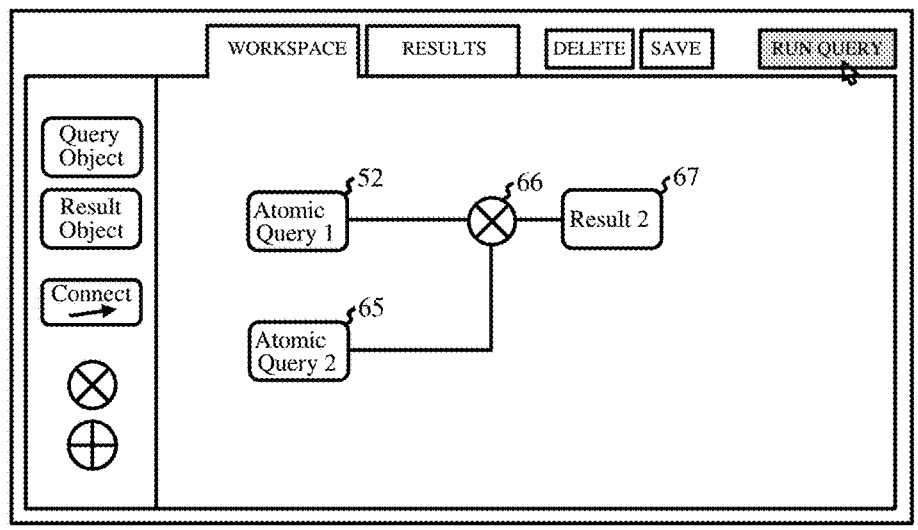
Figure 4h
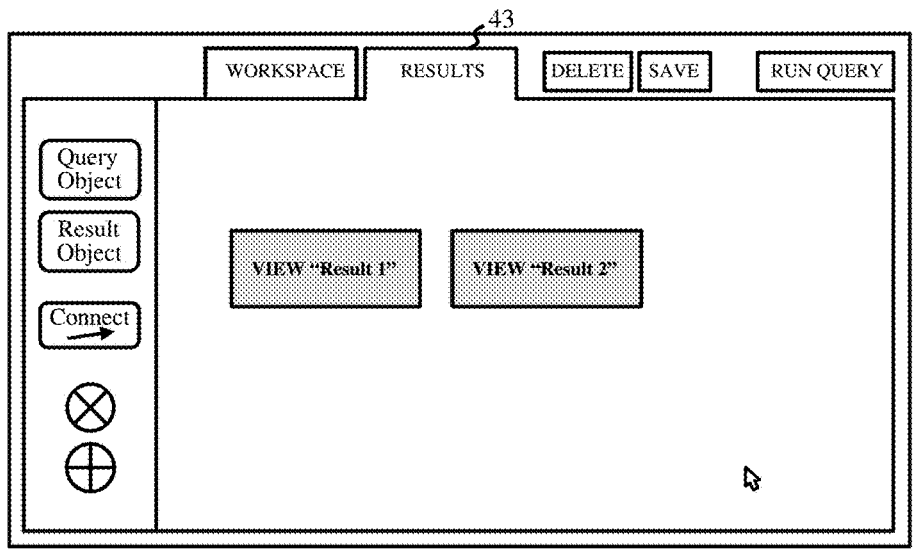
Figure 4i
$$\text{Node ID} \rightarrow \begin{array}{c} \\ 1 \\ 2 \\ 3 \\ 4 \\ 10 \\ 11 \end{array} \begin{bmatrix} 12 & 13 & 14 & 15 & 16 & 17 \\ 1 & 0 & 0 & 0 & 0 & 0 \\ 0 & 0 & 0 & 0 & 1 & 0 \\ 0 & 0 & 0 & 0 & 0 & 1 \\ 0 & 1 & 0 & 0 & 0 & 0 \\ 0 & 0 & 1 & 0 & 0 & 0 \\ 0 & 0 & 0 & 1 & 0 & 0 \end{bmatrix}$$
Figure 6

GRAPHICAL USER INTERFACE FOR DEFINING ATOMIC QUERY FOR QUERYING KNOWLEDGE GRAPH DATABASES

BACKGROUND

The present disclosure relates generally to querying knowledge graph databases. Methods are provided for querying knowledge graph databases using a graphical user interface, together with systems and computer program products implementing such methods.

In knowledge graph databases, stored information is represented by means of a knowledge graph which has nodes interconnected by edges. Nodes of the graph represent entities for which entity data, characterizing those entities, is stored in the database. Entities may, for example, correspond to people, companies, devices, etc. More generally, nodes may represent any entity (real or abstract) for which information needs to be stored. The entity data stored for a node may comprise one or more data items, often called "properties" or "property values", describing particular features of an entity. Edges of the graph represent relationships between entities. An edge connecting two nodes of the graph represents some defined relationship which is applicable to the entities represented by those nodes. A graph may accommodate different relationships between entities, with each edge having a specified type, indicated by an edge name or "label", signifying the particular relationship represented by that edge. Nodes may also have associated names, or labels, to indicate different types or categories of node corresponding to different entity-types represented in the graph.

Knowledge graphs provide highly efficient structures for representing large volumes of diverse information about interrelated entities. Querying a knowledge graph database involves formulating a query request defining the information needed from the database in such a way that relevant nodes, edges, and properties can be identified, and then following edges in the graph to identify and extract the required data from storage. Knowledge graphs can be conveniently represented using matrices in which non-zero entries signify edges and row and column indices correspond to node identities. The process of identifying and extracting data for a query request can be implemented by performing mathematical operations on such matrices.

SUMMARY

According to at least one embodiment of the present invention there is provided a computer-implemented method for querying a knowledge graph database in which entity data characterizes entities represented by nodes, interconnected by edges, of a knowledge graph, and each edge represents one of a set of relationships between entities which is applicable to the entities represented by nodes interconnected by that edge. The method includes providing a graphical user interface for display by a user computer, the interface enabling definition, in response to user input, of an atomic query which is associated with a floating graphical query object in the interface. The atomic query defines an input set of said nodes for the query, a relationship and an output set of nodes for the query. Also provided in the interface are graphical connector and graphical logical-operator objects which are manipulatable by a user in relation to a plurality of the query objects to define a complex query by constructing a graphical representation of a desired logical combination of the query objects. The method includes, for each atomic query defined via the interface, sending a query request defining that query to the knowledge graph database to obtain atomic query result data comprising entity data for the output set of nodes for the query. The method further includes, for a complex query defined via the interface, processing the atomic query result data corresponding to the plurality of query objects in accordance with the aforementioned logical combination to obtain result data for the complex query, and providing in the interface a representation of the complex query result data.

At least one additional embodiment of the invention provides a computer program product comprising a computer readable storage medium embodying program instructions, executable by a computing system, to cause the computing system to perform a method for querying a knowledge graph database as described above.

At least one further embodiment of the invention provides a computing system comprising a knowledge graph database and logic adapted to implement a method for querying the database as described above.

Embodiments of the invention will be described in more detail below, by way of illustrative and non-limiting example, with reference to the accompanying drawings.

BRIEF DESCRIPTION OF THE SEVERAL VIEWS OF THE DRAWINGS

FIGS. 4*a* through 4*i* illustrate operation of a graphical user interface provided in an embodiment of the invention;

FIG. 6 shows a matrix representing features of the FIG. 5 graph; and

DETAILED DESCRIPTION

Figure 1:
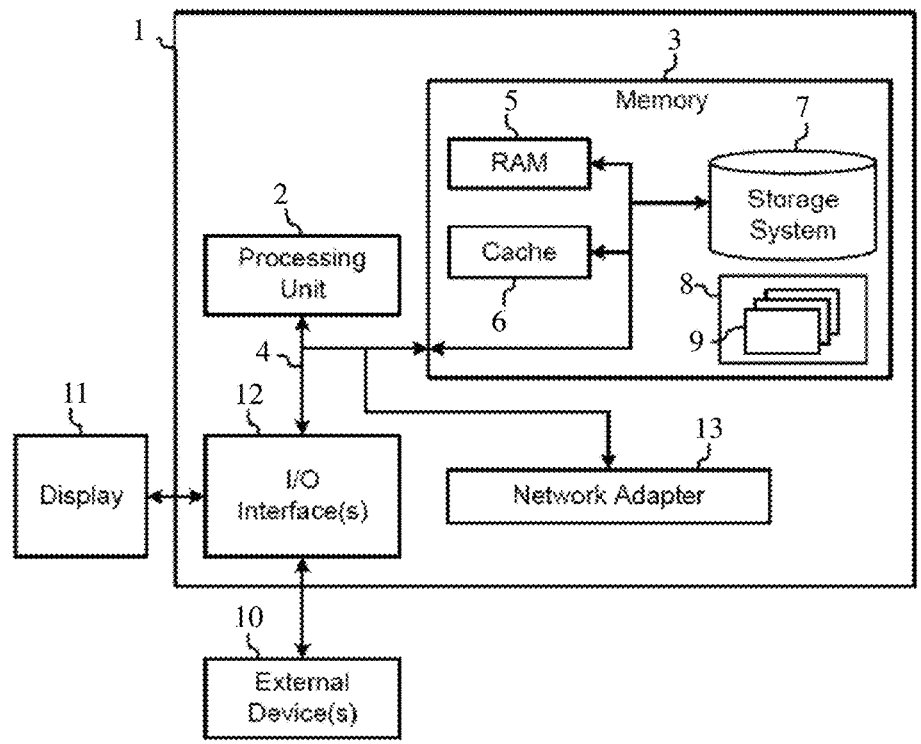
FIG. 1 is a schematic representation of a computing system for implementing knowledge graph database query methods embodying the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments to be described can be performed as computer-implemented methods for querying a knowledge graph database. The methods may be implemented by a computing system comprising one or more general- or special-purpose computers, each of which may comprise one or more (real or virtual) machines, providing functionality for implementing the operations described herein. Steps of methods embodying the invention may be implemented by program instructions, e.g. program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

FIG. 1 is a block diagram of exemplary computing apparatus for implementing methods embodying the invention. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the invention. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. It should be understood that although not shown, other hardware and/or software components could be used in conjunction with computer 1. Examples include, but are not limited to: microcode, device drivers, redundant processing units, external disk drive arrays, RAID systems, tape drives, and data archival storage systems, etc.

Figure 2:
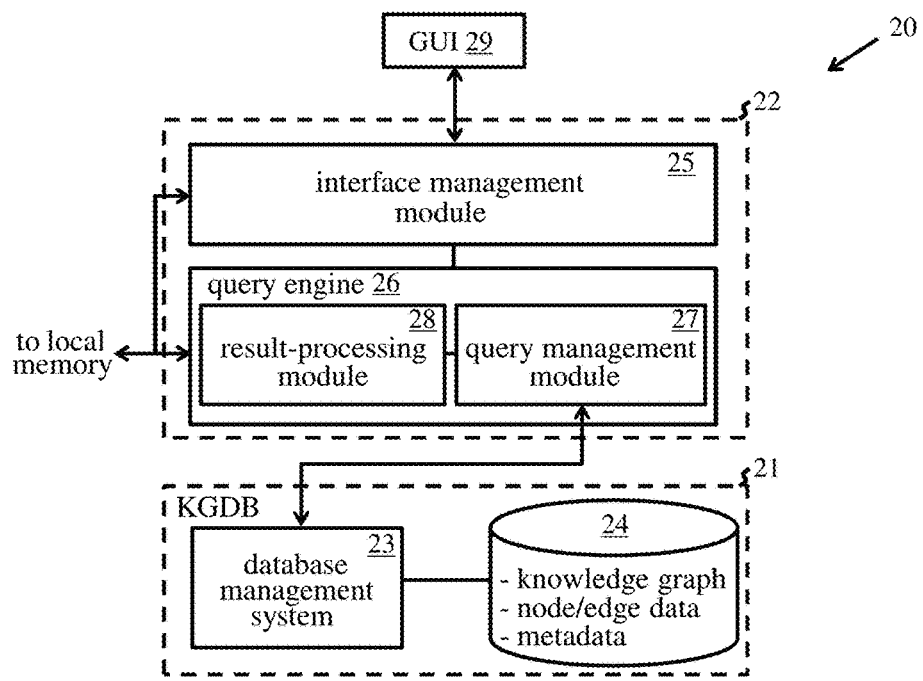
FIG. 2 is a schematic representation of component modules of a computing system for implementing methods embodying the invention.

FIG. 2 is a schematic representation of component modules in an exemplary computing system for implementing methods embodying the invention. The system 20 comprises a knowledge graph database (KGDB) 21, and query logic indicated generally at 22. KGDB 21 comprises a database management system 23, and database memory 24. Query logic 22 comprises an interface management module 25, and a query engine 26 comprising a query management module 27 and a result-processing module 28.

Database memory 24 comprises one or more memory/storage components storing the data structures of the knowledge graph database. These data structures include a knowledge graph having nodes interconnected by edges. Nodes represent entities about which data is stored in the database. Each edge represents one of a set of (one or more) relationships between entities which is applicable to the entities represented by nodes interconnected by that edge. Data structures are also provided to store the node/edge data associated with nodes and edges of the graph. Nodes of the graph are represented by unique node identifiers (IDs) in these structures, and an edge is identified by the node IDs of the pair of nodes it connects. These structures include the entity data which characterizes the entities represented by nodes. The entity data for a node may comprise one or more properties describing particular features of the associated entity. For example, properties may be stored as key:value pairs, such as "name:John", where the key identifies the property type and the value indicates the corresponding property value. Nodes may also have associated labels indicating different types of node in the graph, e.g. labels signifying "people nodes", "company nodes", "device nodes", etc. Where more than one relationship is represented in the graph, edges may have labels to indicate the relationships they represent, and the edge data then includes the associated label for each edge. In some graphs, edges may also have properties, in which case the edge data includes any associated properties for each edge. Any necessary metadata associated with the various data structures is also stored in database memory 24.

Database management system 23 typically comprises a set of program modules providing functionality for maintaining, updating, and accessing stored data in database memory 24. Such management systems can be implemented in generally known manner, and the particular implementation is orthogonal to the operations described herein.

The interface management module 25 comprises functionality for providing a graphical user interface (GUI) 29, described further below, for display by a user computer. This module is responsive to user inputs via GUI 29 to control appearance of the GUI, and accepts inputs relating to database queries as detailed below. The interface management module is adapted to interact with query engine 26 for submission of queries to database 21, providing data defining query requests and requirements for processing and storage of query results, and controls presentation of query results in GUI 29. The query management module 27 of query engine 26 is adapted to send query requests to database 21 for atomic queries defined via GUI 29 as detailed below. The query management module 27 also controls result-processing module 28 to perform any required processing of query results obtained from the database. In particular, processing module 28 is operable to process atomic query results to obtain results for complex queries defined via GUI 29 as described below. The query management module 27 also controls storage of atomic/complex query results in local system memory when required based on inputs from interface management module 25.

In general, the component modules of system 20 may be provided in one or more computers of a computing system. For example, all modules may be provided in a user computer 1 at which GUI 29 is displayed to a user. Alternatively, for example, system 20 may be implemented in a client/server system comprising one or more servers to which user computers (clients) can connect via a network. Such a server system may be implemented as a front-end/back-end system in which a back-end server provides KGDB 21 and a front-end computer/server implements query logic 22. Front-end functionality may be implemented entirely in a user computer displaying GUI 29, or query logic 22 may be wholly or partially implemented in a query server which provides for presentation of GUI 29 at remote user computers, e.g. via a browser, and interaction with a back-end KGDB server.

In general, modules 22 through 28 of system 20 may be implemented by software, e.g., program modules, or hardware or a combination thereof. Functionality may be allocated differently between component modules in computing systems embodying the invention, and functionality of one or more modules may be combined.

Various data structure formats, of generally known type, can be used for storing data in database 21, and the actual stored data structures may correspond directly or indirectly to features of the graph. In particular, KGDB 21 may employ native graph storage, which is specifically designed around the structure of the graph, or non-native storage such as a relational or object-orientated database structure. It suffices to understand that, in a knowledge graph database, a knowledge graph is defined at some level of the database model. Such knowledge graphs can be represented by matrix structures (either dense or sparse) as explained below.

Figure 3:
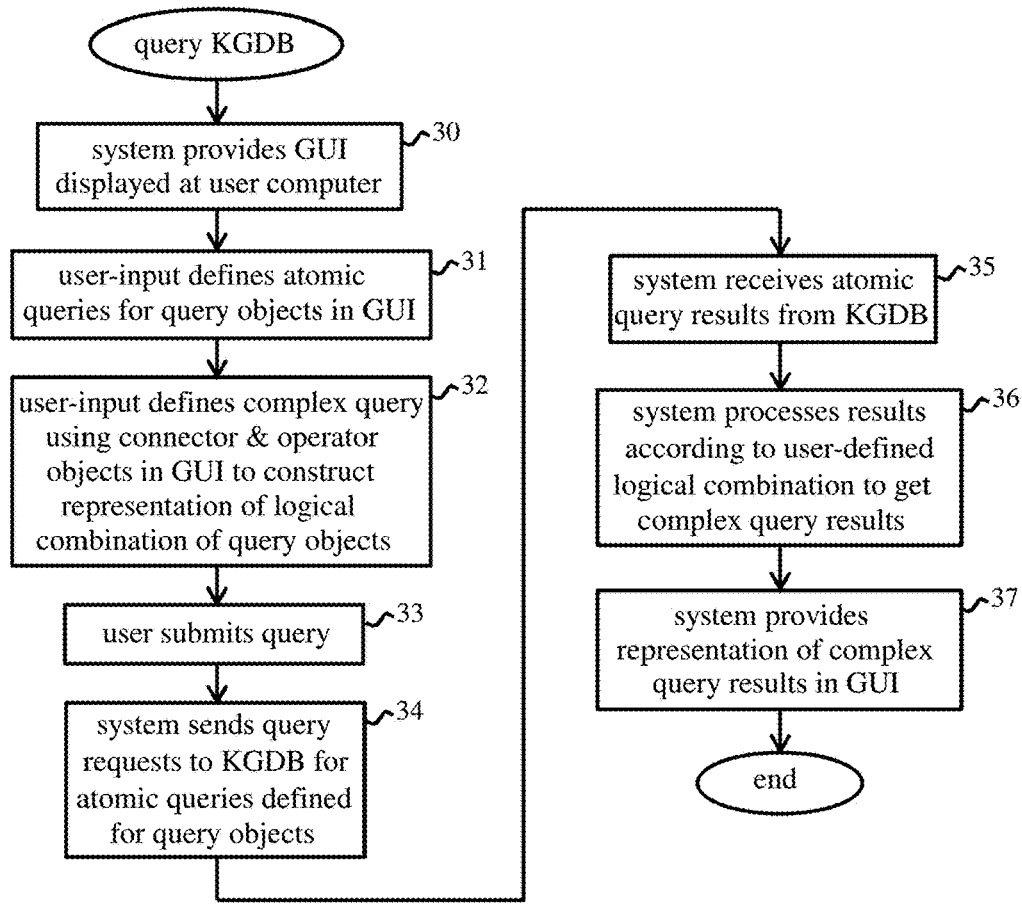
FIG. 3 indicates steps of a knowledge graph database query method embodying the invention.

FIG. 3 indicates basic steps in operation of a computing system implementing a KGDB query method embodying the invention. In step 30, the system provides GUI 29 which is displayed at a user computer. In step 31, the user provides inputs to the GUI to define a plurality of atomic queries. Each atomic query is associated with a floating graphical query object in the GUI. For each of these query objects, the GUI prompts the user for inputs which enable the system to define, for the associated atomic query, at least an input set of knowledge graph (KG) nodes for the query, a relationship (corresponding to an edge in the KG), and an output set of KG nodes for the query. The atomic query therefore corresponds to a selection of a sub-graph of the overall knowledge graph. As well as query objects, GUI 29 also provides graphical connector and graphical logical-operator objects which are manipulatable by a user in relation to query objects to define a complex query. In step 32, the user selects and manipulates one or more logical-operator objects and connector objects in relation to the query objects defined in step 31 to construct a graphical representation of a desired logical combination of the query objects in the GUI. In step 33, the user provides an input to submit the query to the system and run the query. In step 34, for each atomic query defined in step 31, the systems sends a query request, defining that query, to the KGDB to obtain result data for that atomic query. For example, in the system 20 of FIG. 2, interface management module 25 forwards data defining the user inputs for each query object, and the logical combination defined via the user-constructed representation of the complex query, to query management module 27. The query management module then determines the input/output node sets, and relationship, defined by the user inputs for each atomic query, and sends the corresponding query requests to KGDB 21.

The atomic query result data is received from the KGDB in step 35. For each atomic query, this result data comprises (at least) entity data for the defined set of output nodes for the query as discussed further below. In step 36, the system then processes the atomic query result data, corresponding to the plurality of query objects defined in step 31, in accordance with the logical combination defined in step 32 to obtain result data for the complex query. For example, in system 20 of FIG. 2, query management module 27 controls processing module 28 to generate the complex query result data from the atomic query results. In step 37, the interface management module 25 provides a representation of the complex query result data in GUI 29, whereby the complex query results are displayed to the user.

The above procedure provides a highly-efficient system for obtaining complex query results from a KGDB. Complex query results are obtained by submitting basic atomic queries which can be processed very efficiently by the KGDB. Conceptually, each atomic query simply requires following edges (corresponding to the relationship specified for the atomic query) from the defined set of input nodes in the KG to the nodes connected to those edges. The defined set of output nodes can be selected from the nodes so reached, and entity data for those nodes is then returned for the query. Such access procedures can be performed by very simple operations in the KGDB. Complex query results are obtained by additional processing which can be efficiently performed externally of the KGDB. Analysis and deconstruction of complex queries, and selection of efficient access strategies for complex queries in the KGDB, is not required. Moreover, formulation and submission of complex KGDB queries is dramatically simplified for users. The GUI allows complex queries to be constructed in an intuitive manner from simple atomic queries via graphical representation. No knowledge of a formal database query language is needed, and even inexperienced users can formulate complex queries via simple intuitive operations familiar to computer users.

The input options for definition of atomic queries can be presented in various ways in GUI 29, e.g. via listed menu options or auto-completion of text input by users. The available options will depend on the underlying graph for a particular application. The options can be conveniently presented in a user-friendly format which can be interpreted by the system to define the input/output node sets and relationship for an atomic query. Note that elements of an atomic query may be implicitly-defined in some instances. For example, if a KG has only one relationship/edge type, then the relationship is implicitly defined for all atomic queries. Where a KG has a plurality of node types, the input and/or output node sets may be defined by a specified node type. If a KG has only one type of node, the output node set for an atomic query may also be defined implicitly, i.e. as any node connected to a defined input node by the defined edge/relationship. A node set may be further defined by a requirement relating to property values. For example, a node set may be defined by specifying a particular property value or values for the required nodes, or a condition, such as a numerical range or minimum/maximum restriction etc., which a property value must satisfy. Hence, the input/output node sets for an atomic query may comprise one or more nodes which may be defined by types and/or values associated with nodes of the KG, and GUI 29 enables definition of atomic queries via presentation of appropriate user-selectable options.

For each atomic query, the result data will comprise at least some entity data for the defined set of output nodes for the query. For example, the result data may comprise a property value associated with each node in the defined output node set. Where multiple property values can be associated with nodes, the GUI may enable a required property of the output nodes to be specified for an atomic query, whereby the corresponding property value will be obtained in the result data. GUI 29 may also provide an input option for specification by a user of additional data to be included in result data for an atomic query, such as one or more property values for input nodes and/or output nodes. A query request for such an atomic query then further defines the additional data to be obtained from the knowledge graph database.

FIGS. 4*a* through 4*i* illustrate more detailed operation of an embodiment providing an exemplary GUI 40. In this example, a pointing device (e.g. a mouse, touchpad, joystick, trackerball, etc.) is used to control a cursor 41 for user inputs to the GUI. The GUI 40 has a "workspace" tab 42, shown open in FIG. 4*a*, a "results" tab 43 and various clickable icons for user input functions. Workspace tab 42 opens the window shown in FIG. 4*a* having a panel 44 of object icons on the left of a canvas area 45. The object icons comprise a Query Object icon 47, a Result Object icon 48, a Connector Object icon 49, and logical-operator icons 50 comprising an AND icon ẞ and an OR icon ⊕.

Figure 4A:
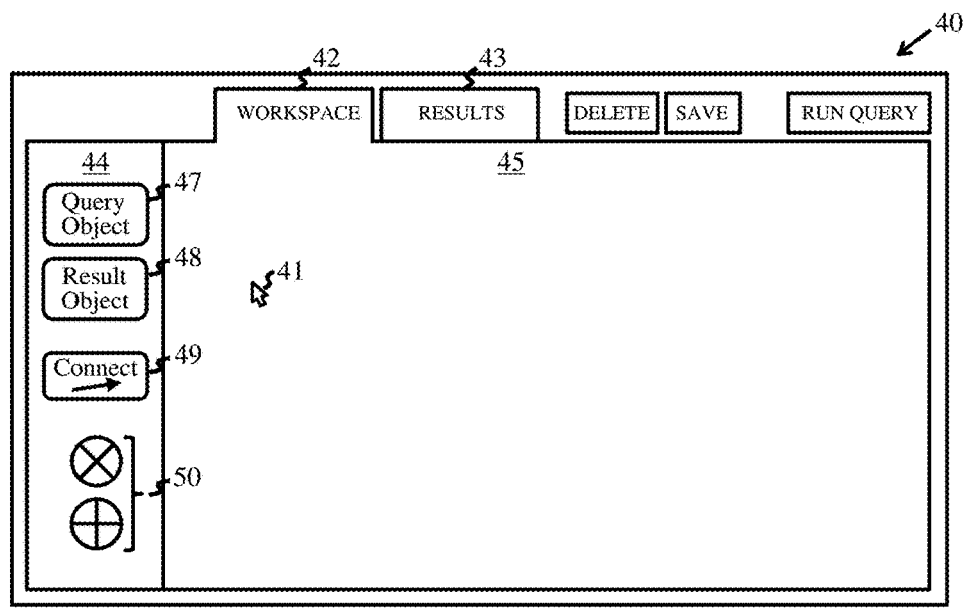
Figure 4B:
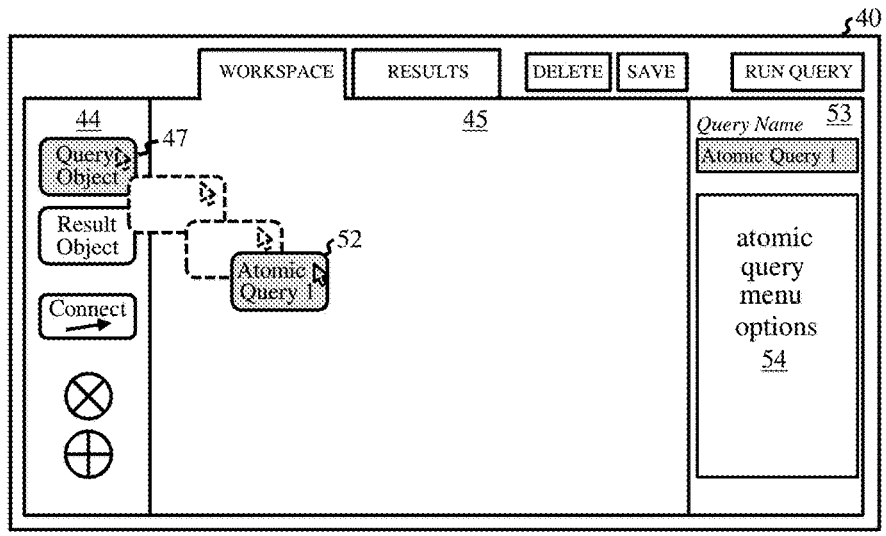

To define an atomic query, the user clicks on Query Object icon 47 in panel 44, and drags a floating graphical query object 52 onto canvas 45 as shown in FIG. 4*b*. This first query object is automatically labeled "Atomic Query 1" by interface management module 25. An input options panel 53 appears concurrently on the right of the canvas. This panel presents user-selectable menu options, indicated schematically here at 54, for definition of the atomic query associated with query object 52. The menu options 54 offer application-specific input choices from which the user can select inputs for the query. The resulting user inputs via options panel 53 ultimately enable query logic 22 to define the input/output node sets and KG relationship for the atomic query.

Figure 4C:
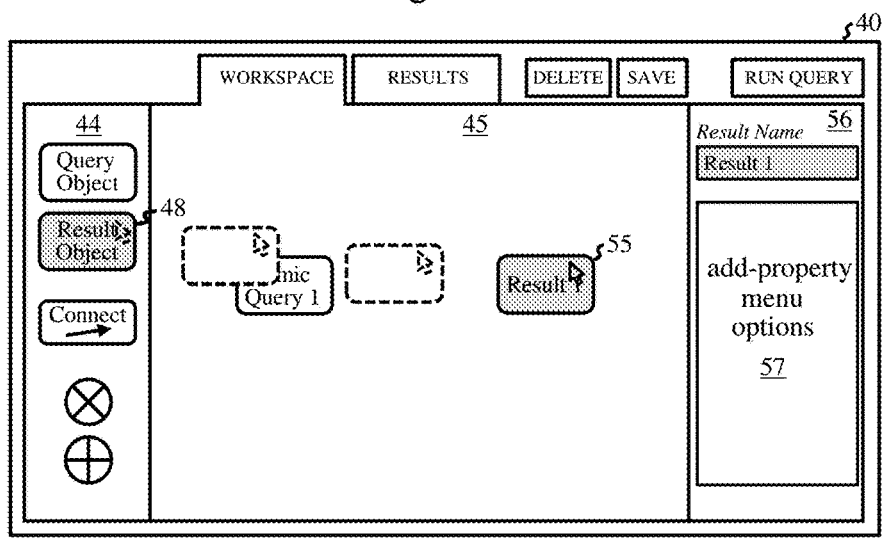

Next, the user clicks on Result Object icon 48 and drags a floating graphical result object 55 onto canvas 45 as shown in FIG. 4*c*. Result object 55 is automatically labeled "Result 1" by interface management module 25. An options panel 56 for the result object appears concurrently on the right of the canvas. This panel presents an "add-property" input option via which the user can optionally specify additional data to be included in the result data for the atomic query. This add-property option is provided by user-selectable menu options, indicated schematically here at 57, via which the user can select one or more additional property values, associated with input and/or output nodes for the query, to be specified in the query results. The add-property option is described further for a specific example below.

Figure 4D:
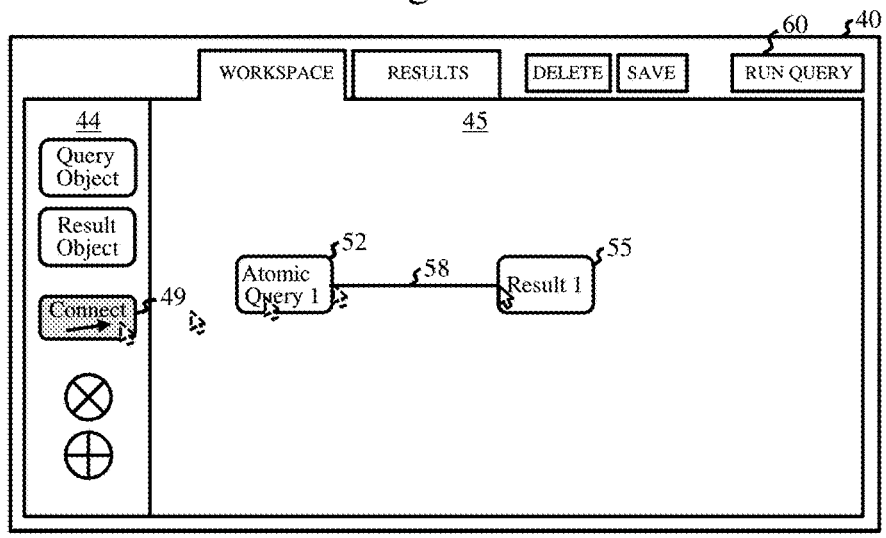
Figure 4E:
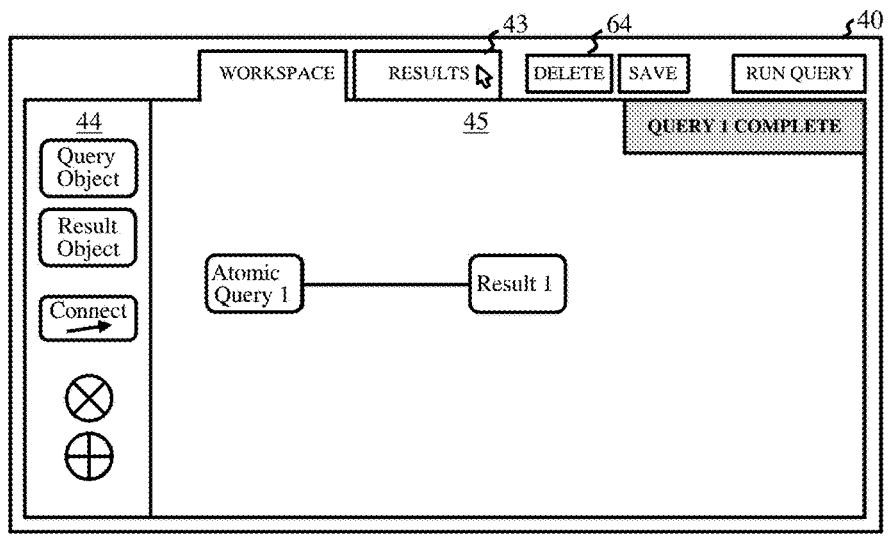
Figure 4F:
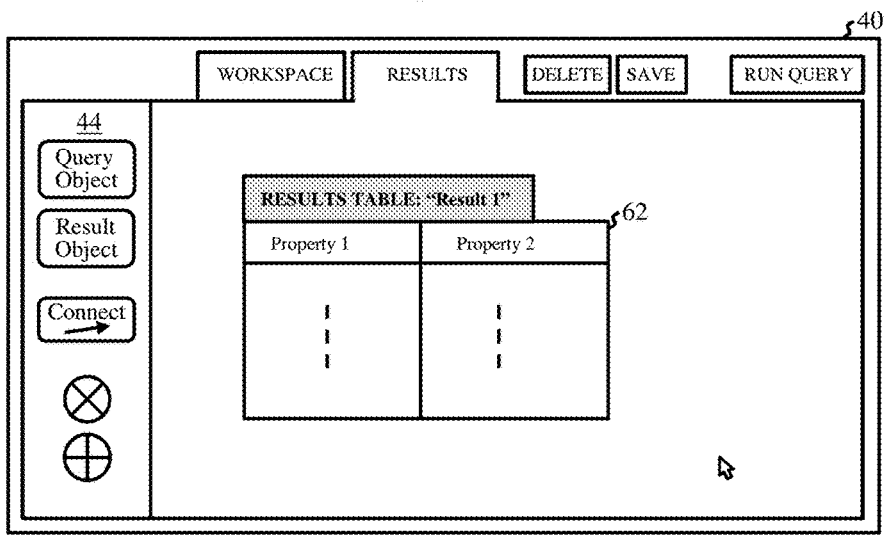

Result object 55 is connectable to query object 52 via a connector object as illustrated in FIG. 4*d*. The user clicks on Connector Object icon 49 and then drags a connector, here line 58, between query object 52 and result object 55. The user may then submit the query by clicking a Run Query icon 60 at the top of the GUI. Interface management module 25 then sends the various menu options selected by the user to Query management module 27. The query management module processes these menu options to define the input set of nodes, relationship and output set of nodes for the query, and submits a corresponding query request to KGDB 21. This query request further defines any additional property values, selected via the add-property option described above, to be obtained from the KGDB for the query. On receipt of the atomic query result data, query management module stores the result data in local system memory as result-object data for result object 55. The query management module then signals completion of the query to interface management module 25 which displays an appropriate notification to the user, here a message "Query 1 complete" as indicated in FIG. 4*e*. The user may then select results tab 43 whereupon interface management module 25 accesses the result-object data stored for result object 55 and provides a representation of the result data (which in this instance corresponds to the results for Atomic Query 1) in the GUI. In this example, the result data is represented via a table 62 displaying property values (here for two properties) as indicated schematically in FIG. 4*f*.

Figure 4G:
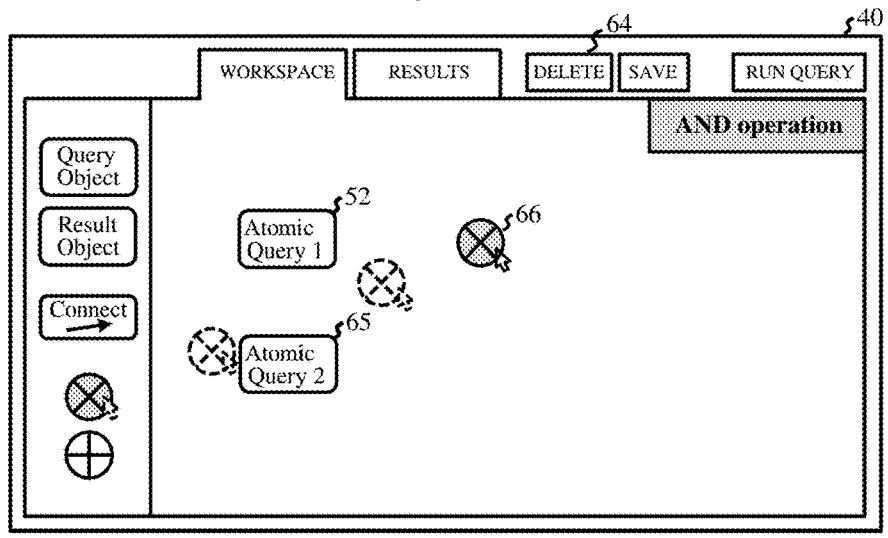

Construction of a complex query is illustrated in FIGS. 4*g* and 4*h*. From the workspace of FIG. 4*e*, the user can delete the connector and result objects from the workspace, e.g. by selecting these objects and clicking delete icon 64. The user then defines a second atomic query, associated with a new query object 65, as described for Atomic Query 1. Next, the user selects a logical operator icon, here AND, and drags operator object 66 onto the canvas as shown in FIG. 4*g*. The user connects query objects 52 and 65 to operator object 66 via connector objects to construct a graphical representation of the desired logical combination of query objects, and connects a new result object 67, labeled "Result 2", to the operator object as shown in FIG. 4*h*. The resulting representation thus defines the combination "Atomic Query 1 AND Atomic Query 2". On submission of the query to system 20, query management module 27 sends a query request for Atomic query 2 to KGDB 21. On receipt of the query results, query management module controls processing module 28 to process the result data for the two atomic queries in accordance with the logical AND operation to obtain operation-result data. The operation-result data is stored as result-object data for result object 67. This result-object data provides the complex query results in this example. On selecting the results tab 43, the GUI presents options to view the results for both result objects, "Result 1" and "Result 2", as shown in FIG. 4*i*. The user can select "View Result 2" to obtain a representation of the complex query result data, e.g. in the form of a table containing the various properties retrieved for the query.

It can be seen that GUI 40 of this embodiment enables selective storage of results for individual atomic queries as well as a complex query results by means of result objects defined in the GUI. Results for various stages in a complex query can thus be stored and presented to the user. The add-property feature, associated with results objects in this example, allows convenient specification of additional property values to be included in the result data.

Operation of GUI 40 is described further below for an application having a knowledge graph shown in FIG. 5. This (highly-simplistic) KG 70 comprises four types of nodes, labeled "People", "Company", "Age" and "Money". Nodes, represented by circles containing a node ID number, are grouped according to type in the figure as indicated by the shaded areas. The KG expresses five different relationships represented by directed edges, indicated by arrows, whose edge label is indicated in the Edge:Relationship table shown. An example of entity data is also indicated for the node with ID=1. This node has node-label "People" and a property "Name" with value "John". Edges from this node indicate that John has a salary defined by entity data for Node ID=8, is employed by a company defined for Node ID=11, and is of an age defined for Node ID=12.

Nodes and edges in KG 70 can be represented by a matrix in which the row and column indices, i and j respectively, map to node IDs. A "1" at position [i, j] in the matrix indicates that there is an edge in the KG from the node corresponding to index i to the node corresponding to index j, while a "0" indicates that no edge links these nodes. Such a matrix for the relationship "years old" is shown in FIG. 6. For large numbers of nodes, KG matrices are represented as sparse matrices, i.e. mostly containing zeros, because knowledge graphs typically contain large numbers of nodes but relatively few node-pairs are connected by edges. KG matrices can be efficiently stored as "edge lists" in which only non-zero matrix entries, i.e. edges, are represented by the position indices [i, j] which correspond to the connected node IDs. However, while large matrix structures can take advantage of the sparse matrix representation, in general either dense or sparse matrix representations can be used for KG matrices.

Figure 5:
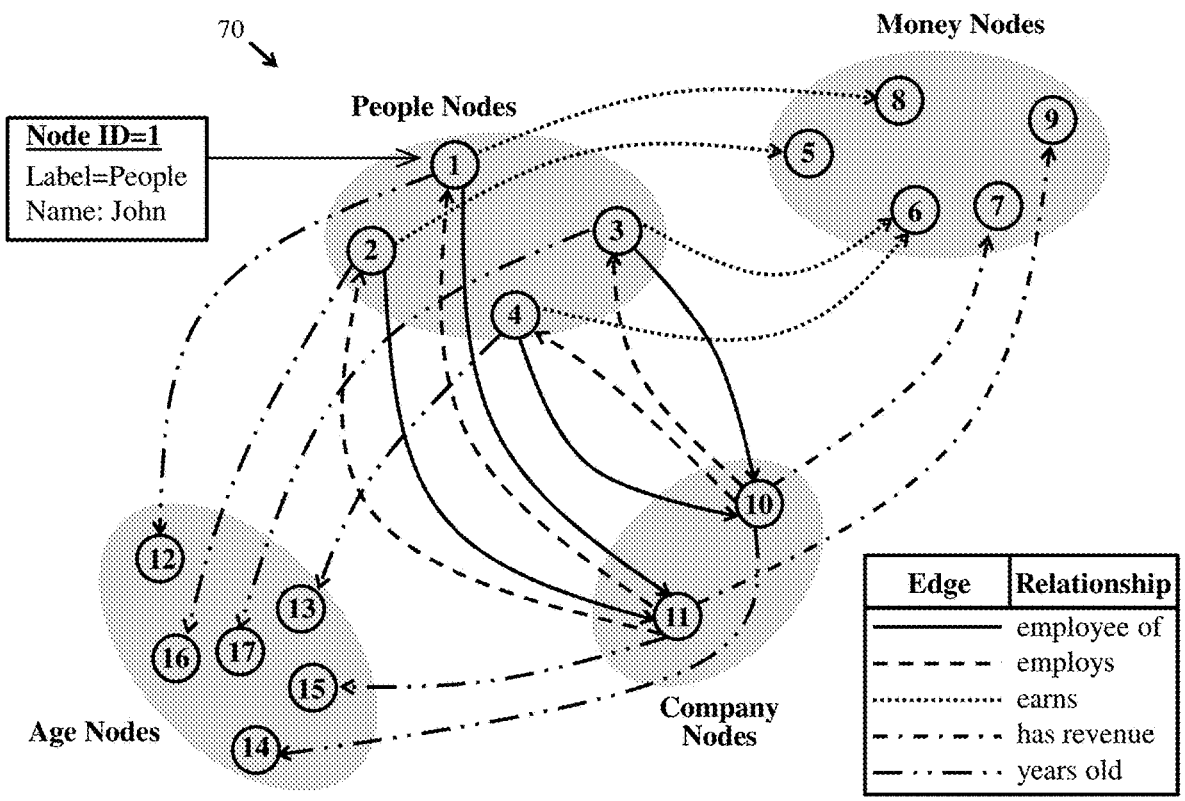
FIG. 5 illustrates structure of a simple knowledge graph for an exemplary application.
Figure 7A:
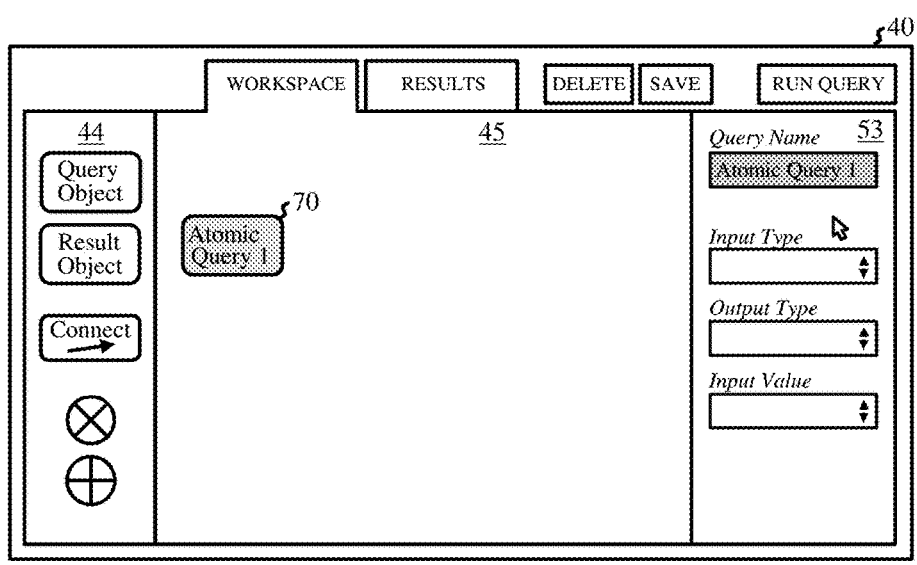
FIGS. 7*a* through 7*i* illustrate construction of a complex query for the knowledge graph of FIG. 5 via a graphical user interface provided in an embodiment of the invention.
Figure 7B:
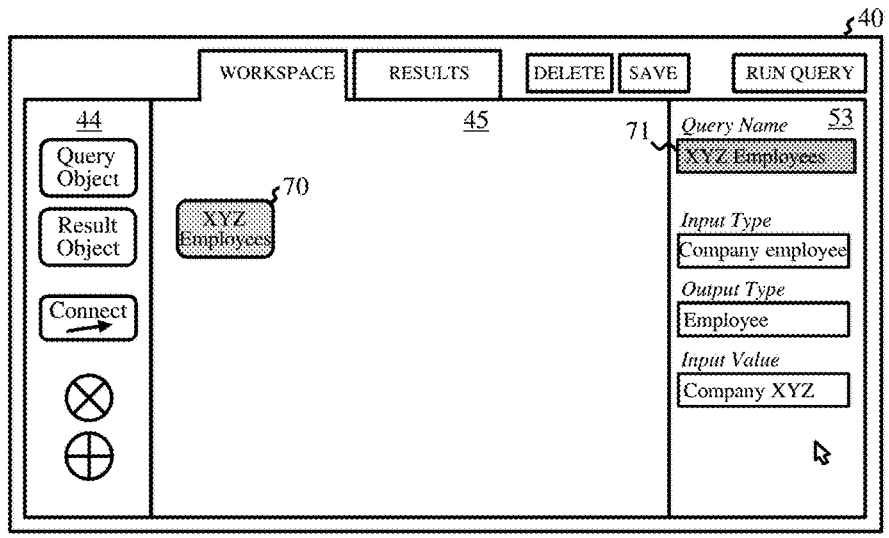

Construction of an exemplary complex query for the FIG. 5 KG is illustrated in FIGS. 7a through 7i. This query corresponds to a request for the salaries of all employees of Company XYZ who are over 50 years old. In FIG. 7a, the user defines an atomic query for a first query object 70 via options panel 53. This query is to request names of employees of Company XYZ. In this embodiment, options panel 53 presents pull-down menu options for "Input Type", "Output Type" and "Input Value" for a query object. The Input and Output Type menus present selectable options for defining the respective node types for the input and output nodes for the atomic query, and the options presented also allow definition of the required relationship in a user-intuitive manner. The Input Value menu allows selection of a requirement relating to property values for the input node set. The user input selections for query object 70 are shown in FIG. 7b. The Input Type selection is "Company employee" and the Output Type selection is "Employee". This indicates to the system that the input node set has node label "Company", that the output node set has node label "People", and that the required relationship is "employs". The Input Value is selected as the company name "Company XYZ", further defining the required input node set here as the company node with a property value=Company XYZ. A Query Name input box 71 in options panel 53 also allows the user to type a name for query object 70, here "XYX Employees" which then appears in query object 70.

Figure 7C:
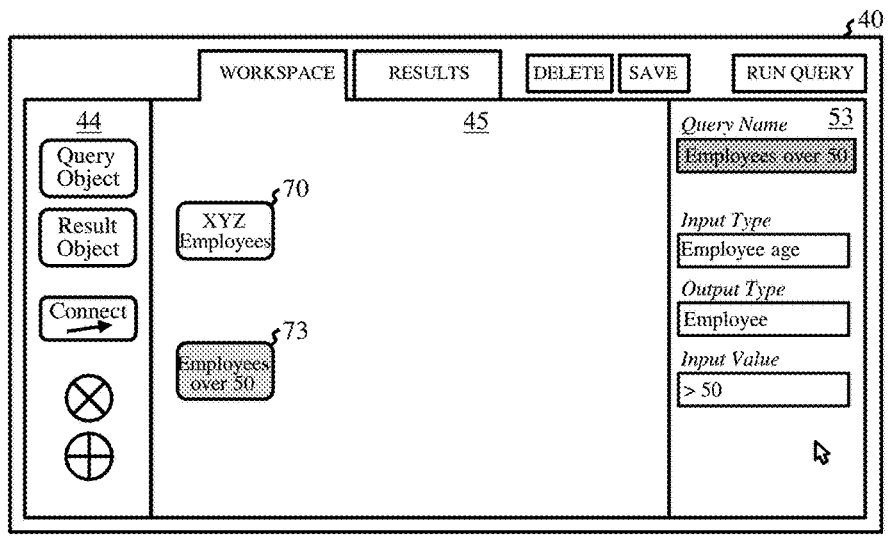

Next, in FIG. 7c, the user defines a second atomic query for a new query object 73. This query corresponds to a request for names of people aged over 50. The input options selected in panel 53 for this object are shown as: Input Type="Employee age"; Output Type="Employee"; and Input Value=greater than 50. (For specifying conditions on numerical values such as age, the system may present a visual tool (not shown here), such as a range scale with a draggable pointer or range bar, under the input value box for convenient definition of required values). These inputs indicate to the system that the input node set has node label "Age" and a property value>50, that the output node set has node label "People", and that the required relationship is "years old". The user names query object 73 as "Employees over 50" here.

Figure 7D:
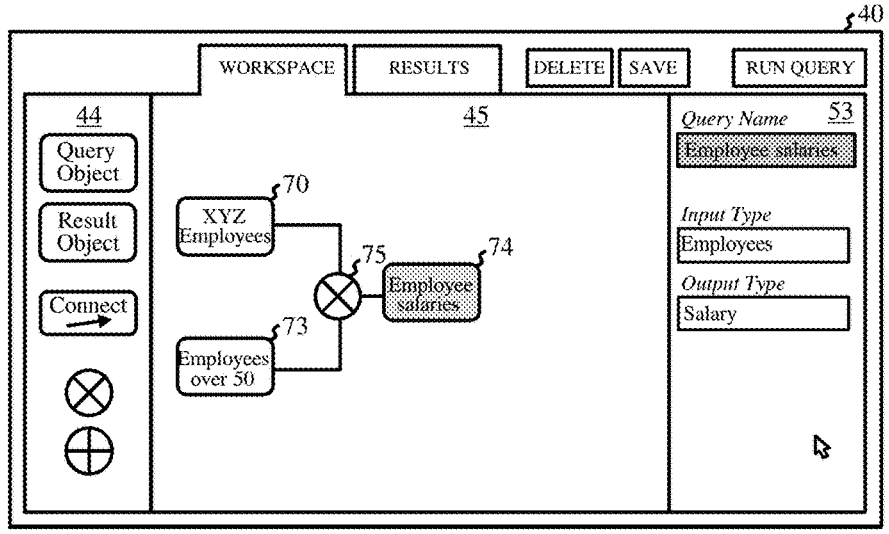

In FIG. 7d, the user constructs a graphical representation of the complex query by connecting a third query object 74 to query objects 70 and 73 via an AND operator object 75. The input selections for query object 74, named "Employee salaries", are shown in options panel 53. Input Type is selected as "Employees" and Output Type is selected as "Salary". This indicates that the output node set has node label "Money" and that the required relationship is "earns". The Input Value menu is omitted here because the input values are defined, via the graphical representation, as the names of employees in the results of the AND operation for query objects 70 and 73.

Figure 7E:
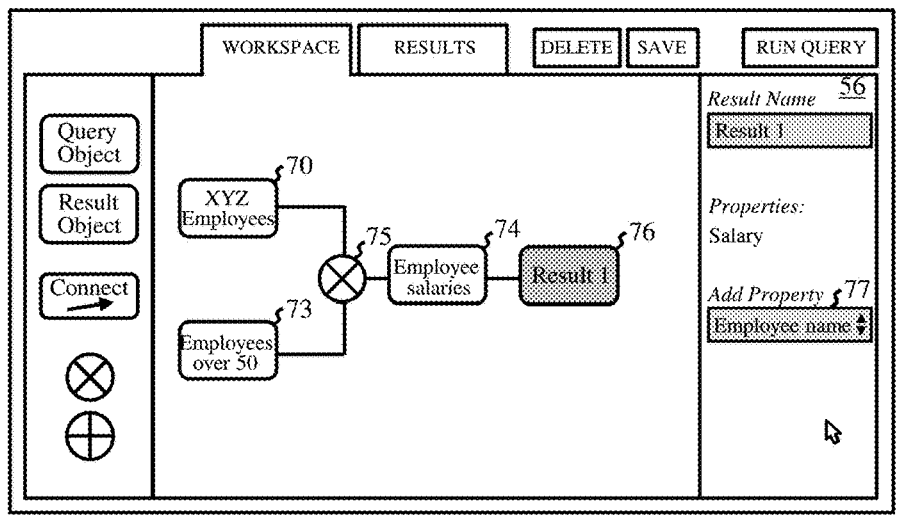
Figure 7F:
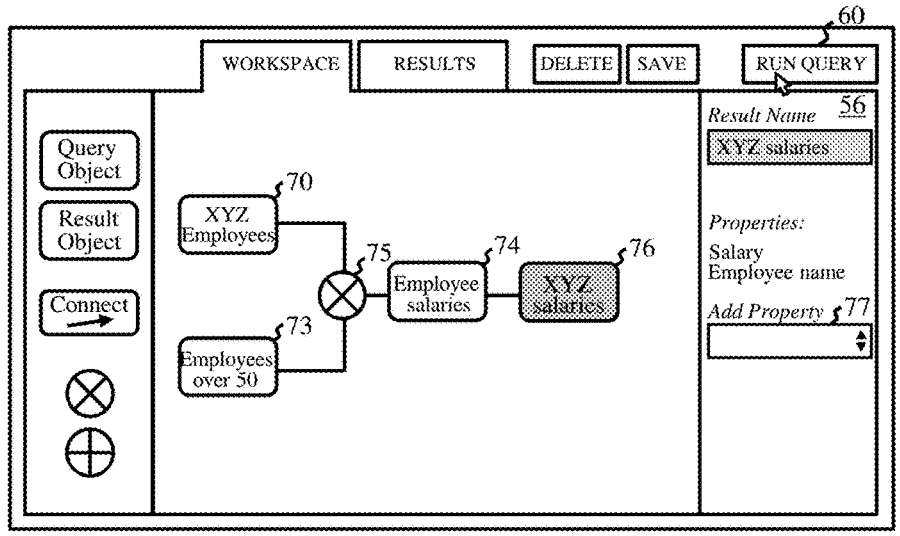
Figure 7G:
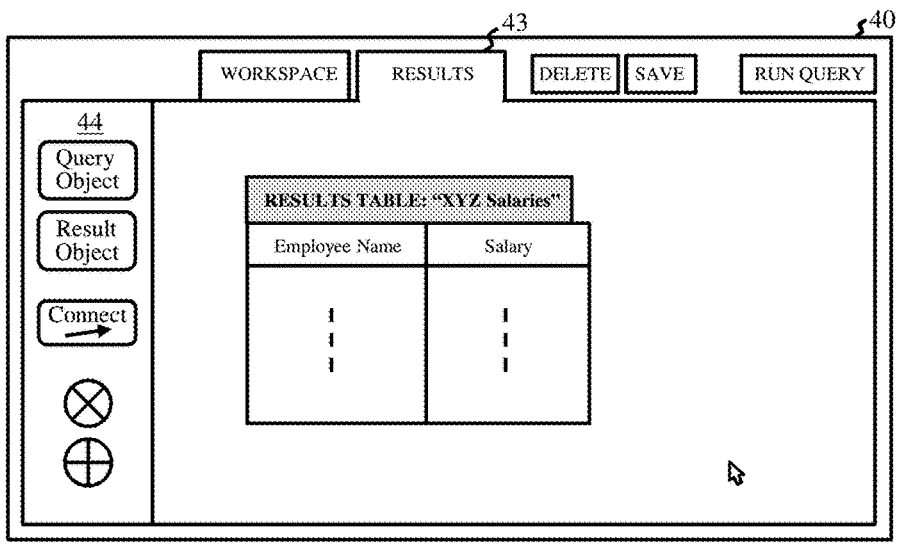

In FIG. 7e, the user connects a result object 76 to query object 74, and result options panel 56 appears. This panel displays the properties already to be returned for the query as "salary", and provides an options menu 77 for additional properties to appear in the query results. Here the user selects the additional property "Employee name" This indicates to the system that the Name property value of the input nodes for query object 74 should be included in the atomic query result data for that query. The added property then appears in the displayed properties list as shown in FIG. 7f. In this figure, the user names result object 76 "XYZ salaries" and clicks the Run Query icon 60. In response, system 20 submits atomic query requests for query objects 70 and 73 to KGDB 21, and then processes the results in accordance with the logical AND operation to obtain the input node set for query object 74. The system then submits this query request to the KGDB, and provides a results table for the complex query in results tab 43 as shown in FIG. 7g. The complex query results are stored in local system memory for result object 76.

Figure 7H:
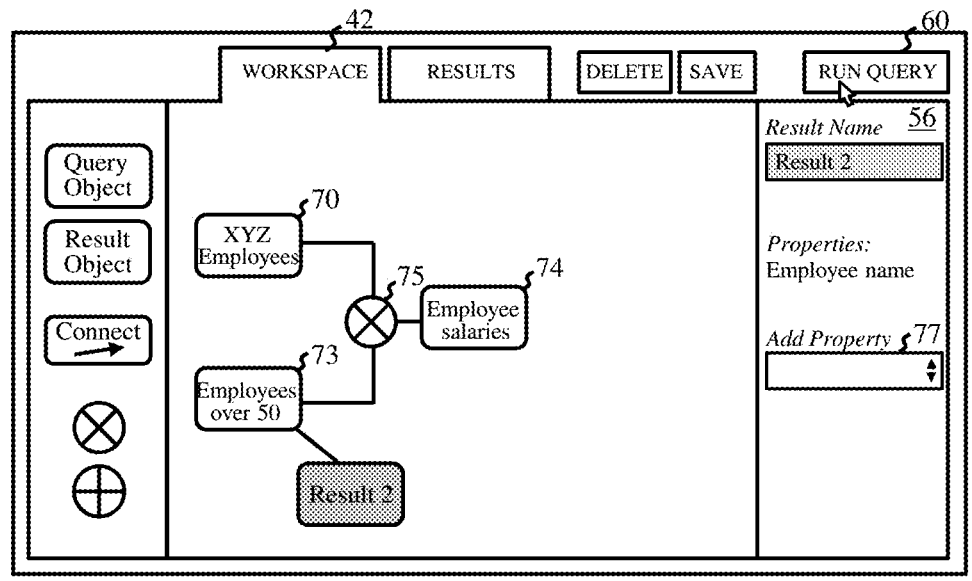
Figure 7I:
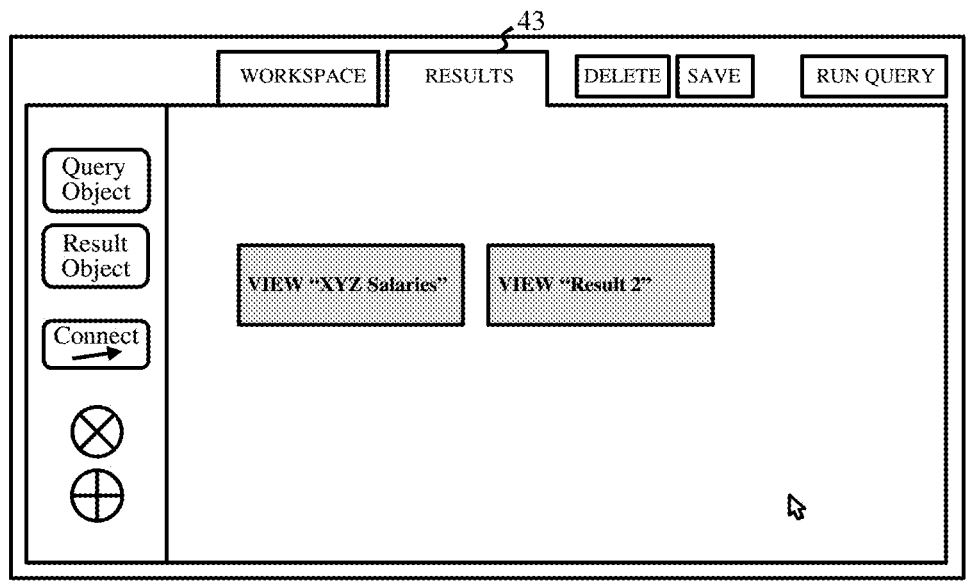

In FIG. 7h, the user returns to workspace tab 42, removes results object 76, and connects a further result object to query object 73 as shown. On clicking the Run Query icon 60, the system re-submits a query request for query object 73, and stores the query results for this result object. The results tab 43 then offers the user options to view the results for both result objects as indicated in FIG. 7i.

It will be seen that the above embodiment provides selectable menu options for definition of atomic queries in a way that is more intuitive for users than direct selection of node/edge types in the KG, and the system then defines the required elements of an atomic query from the user's selections. KGDB accesses for the resulting atomic queries can be performed very efficiently by simple mathematical operations on KG data structures. In particular, using the sparse matrix data structures described above (or alternatively the easier dense representation), simple matrix-by-vector multiplication operations can be performed to identify KG nodes, corresponding to the defined output node set, reached by the specified edge from the defined input node set for an atomic query. However complex a query may be, it can always be decomposed into logical combinations of atomic queries which can be efficiently serviced by KGDB 21 and then processed by query engine 26 to obtain the complex query results.

GUI 40 may also provide various additional options for further processing of result data by processing module 28. For example, results tab 43 may present selectable options for additional mathematical/analytical operations on results, such as averaging sorting, correlation, statistical analysis, regression, and so on. Results tab 43 may also offer different representation formats for results, such as options for presenting results in a table, histogram, pie-chart, etc. In general, the GUI may provide a representation of result data in any form appropriate to an application, and may present the result data per se or some further-processed representation thereof, e.g. a statistical analysis of the result data.

It will be appreciated that various changes and modifications can be made to the exemplary embodiments described above. For example, other logical operator icons, such as a NOT operator, may be included for use in constructing complex queries. As a further example, the "add property" input option may be associated in the GUI with a query object and/or a result object, or could be associated with a dedicated graphical "add-property" object which can be connected into a graphical representation of a query, e.g. via a connector object. The system may then determine, from the location of this object, which atomic query the additional data should be specified in the query request for.

While a cursor is controlled by a pointing device for user-interaction with GUI 40, in general any type of user input mechanism may be used, such as a touch-sensitive screen, light pen, voice recognition system, etc. depending on the particular nature and functionality of the user computer e.g. a desktop, laptop, tablet, mobile phone, etc. Numerous other ways can also be envisaged for presenting the various objects and options in the GUI for user selection.

Computer-implemented methods and systems may be provided for querying a knowledge graph database in which entity data characterizes entities represented by nodes, interconnected by edges, of a knowledge graph, and each edge represents one of a set of relationships between entities which is applicable to the entities represented by nodes interconnected by that edge. Such a method may include providing a graphical user interface for display by a user computer, the interface enabling definition, in response to user input, of an atomic query which is associated with a floating graphical query object in the interface. The atomic query defines an input set of said nodes for the query, a relationship and an output set of nodes for the query. Also provided in the interface may be graphical connector and graphical logical-operator objects which are manipulatable by a user in relation to a plurality of the query objects to define a complex query by constructing a graphical representation of a desired logical combination of the query objects. The method may include, for each atomic query defined via the interface, sending a query request defining that query to the knowledge graph database to obtain atomic query result data comprising entity data for the output set of nodes for the query. The method may further include, for a complex query defined via the interface, processing the atomic query result data corresponding to the plurality of query objects in accordance with the aforementioned logical combination to obtain result data for the complex query, and providing in the interface a representation of the complex query result data.

In general, where features are described herein with reference to a method embodying the invention, corresponding features may be provided in a system/computer program product embodying the invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for querying a knowledge graph database in which entity data characterizes entities represented by nodes, interconnected by edges, of a knowledge graph and each edge represents one of a set of relationships between entities which is applicable to the entities represented by nodes interconnected by that edge, the method comprising:
    providing a graphical user interface for display by a user computer, the interface enabling definition, in response to user input, of an atomic query which is associated with a floating graphical query object and a floating graphical result object in the interface, the atomic query defining an input set of said nodes for the query, a said relationship and an output set of said nodes for the query, the floating graphical result object for specifying a property of the output set of said nodes for the query, wherein responsive to the floating graphical result object being dragged into a canvas of the graphical user interface, an options panel is automatically presented concurrently, the options panel for specifying additional data to be included in resulting data for the atomic query;
    providing in said interface graphical connector and graphical logical-operator objects which are manipulatable by a user in relation to a plurality of said query objects to define a complex query by constructing a graphical representation of a desired logical combination of the query objects;
    for each atomic query defined via the interface, sending a query request defining that query to the knowledge graph database to obtain atomic query result data comprising entity data for the output set of nodes for the query;
    for a complex query defined via the interface, processing the atomic query result data corresponding to said plurality of query objects in accordance with said logical combination to obtain result data for the complex query; and
    providing in said interface a representation of the complex query result data.

2. A method as claimed in claim 1 wherein said knowledge graph comprises a plurality of types of nodes, and wherein said interface enables definition of respective node types for said input set of nodes and said output set of nodes for an atomic query.

3. A method as claimed in claim 1 wherein the entity data for each node of the knowledge graph comprises a respective set of property values, and wherein said interface enables definition of a requirement relating to property values for at least one of said input set of nodes and said output set of nodes for an atomic query.

4. A method as claimed in claim 3 wherein said interface enables definition of a requirement relating to property values for said input set of nodes.

5. A method as claimed in claim 1 including:
    providing in said interface menu options, selectable by a user, to enable definition of an atomic query; and
    processing the menu options selected by a user for an atomic query to define said input set of nodes, said relationship and said output set of nodes for the query.

6. A method as claimed in claim 1 including:
    further providing in said interface floating graphical result objects, a result object being connectable, via a said connector object, to a said a query object;
    for any result object connected to a query object, after obtaining the atomic query result data for the atomic query associated with that query object, storing that atomic query result data as result-object data for the result object; and
    providing in said interface a representation of the result-object data for a said result object.

7. A method as claimed in claim 6 wherein said interface further provides for connection of a said result object, via a said connector object, to a said logical-operator object in said graphical representation, the method including:
    for any result object connected to a logical-operator object in said graphical representation, after obtaining the atomic query result data for atomic queries associated with query objects connected to that logical-operator object, processing that atomic query result data in accordance with a logical operation represented by the logical-operator object to obtain operation-result data, and storing that operation-result data as result-object data for the result object.

8. A method as claimed in claim 1 including providing in said interface an input option for specification by a user of additional data to be included in atomic query result data for an atomic query, wherein said query request for that atomic query further defines said additional data to be obtained from the knowledge graph database.

9. A method as claimed in claim 1 wherein the knowledge graph database comprises at least one matrix representing said knowledge graph, whereby result data for a said atomic query can be obtained from the database via matrix-by-vector multiplication.

10. A computer program product for querying a knowledge graph database in which entity data characterizes entities represented by nodes, interconnected by edges, of a knowledge graph and each edge represents one of a set of relationships between entities which is applicable to the entities represented by nodes interconnected by that edge, said computer program product comprising a computer readable storage medium having program instructions embodied therein, the program instructions being executable by a computing system to cause the computing system:
to provide a graphical user interface for display by a user computer, the interface enabling definition, in response to user input, of an atomic query which is associated with a floating graphical query object and a floating graphical result object in the interface, the atomic query defining an input set of said nodes for the query, a said relationship and an output set of said nodes for the query, the floating graphical result object for specifying a property of the output set of said nodes for the query, wherein responsive to the floating graphical result object being dragged into a canvas of the graphical user interface, an options panel is automatically presented concurrently, the options panel for specifying additional data to be included in resulting data for the atomic query;
to provide in said interface graphical connector and graphical logical-operator objects which are manipulatable by a user in relation to a plurality of said query objects to define a complex query by constructing a graphical representation of a desired logical combination of the query objects;
for each atomic query defined via the interface, to send a query request defining that query to the knowledge graph database to obtain atomic query result data comprising entity data for the output set of nodes for the query;
for a complex query defined via the interface, to process the atomic query result data corresponding to said plurality of query objects in accordance with said logical combination to obtain result data for the complex query; and
to provide in said interface a representation of the complex query result data.

11. A computer program product as claimed in claim 10 wherein said knowledge graph comprises a plurality of types of nodes, said program instructions being executable such that said interface enables definition of respective node types for said input set of nodes and said output set of nodes for an atomic query.

12. A computer program product as claimed in claim 10 wherein the entity data for each node of the knowledge graph comprises a respective set of property values, said program instructions being executable such that said interface enables definition of a requirement relating to property values for at least one of said input set of nodes and said output set of nodes for an atomic query.

13. A computer program product as claimed in claim 10, said program instructions being executable to cause the computing system to:
provide in said interface menu options, selectable by a user, to enable definition of an atomic query; and
process the menu options selected by a user for an atomic query to define said input set of nodes, said relationship and said output set of nodes for the query.

14. A computer program product as claimed in claim 10, said program instructions being further executable to cause the computing system:
to provide in said interface floating graphical result objects, a result object being connectable, via a said connector object, to a said a query object;
for any result object connected to a query object, after obtaining the atomic query result data for the atomic query associated with that query object, to store that atomic query result data as result-object data for the result object; and
to provide in said interface a representation of the result-object data for a said result object.

15. A computer program product as claimed in claim 14, said program instructions being further executable to cause the computing system:
to provide in said interface for connection of a said result object, via a said connector object, to a said logical-operator object in said graphical representation; and
for any result object connected to a logical-operator object in said graphical representation, after obtaining the atomic query result data for atomic queries associated with query objects connected to that logical-operator object, to process that atomic query result data in accordance with a logical operation represented by the logical-operator object to obtain operation-result data, and to store that operation-result data as result-object data for the result object.

16. A computer program product as claimed in claim 10, said program instructions being further executable to cause the computing system to provide in said interface an input option for specification by a user of additional data to be included in atomic query result data for an atomic query, wherein said query request for that atomic query further defines said additional data to be obtained from the knowledge graph database.

17. A computing system comprising:
a knowledge graph database in which entity data characterizes entities represented by nodes, interconnected by edges, of a knowledge graph and each edge represents one of a set of relationships between entities which is applicable to the entities represented by nodes interconnected by that edge;
interface management logic adapted to provide a graphical user interface for display by a user computer, the interface enabling definition, in response to user input, of an atomic query which is associated with a floating graphical query object and a floating graphical result object in the interface, the atomic query defining an input set of said nodes for the query, a said relationship and an output set of said nodes for the query, the floating graphical result object for specifying a property of the output set of said nodes for the query, wherein responsive to the floating graphical result object being dragged into a canvas of the graphical user interface, an options panel is automatically presented concurrently, the options panel for specifying additional data to be included in resulting data for the atomic query, and the interface further providing graphical connector and graphical logical-operator objects which are manipulatable by a user in relation to a plurality of said query objects to define a complex query by constructing a graphical representation of a desired logical combination of the query objects;

query management logic adapted, for each atomic query defined via the interface, to send a query request defining that query to the knowledge graph database to obtain atomic query result data comprising entity data for the output set of nodes for the query; and result processing logic adapted, for a complex query defined via the interface, to process the atomic query result data corresponding to said plurality of query objects in accordance with said logical combination to obtain result data for the complex query;

wherein the interface management logic is adapted to provide in said interface a representation of the complex query result data.

18. A system as claimed in claim 17 wherein:
the interface management logic is adapted to provide in said interface menu options, selectable by a user, to enable definition of an atomic query; and
the query management logic is adapted to process the menu options selected by a user for an atomic query to define said input set of nodes, said relationship and said output set of nodes for the query.

19. A system as claimed in claim 18 wherein:
the knowledge graph database is adapted such that said knowledge graph comprises a plurality of types of nodes and the entity data for each node of the knowledge graph comprises a respective set of property values; and
the interface management logic is adapted such that said interface enables definition of respective node types for said input set of nodes and said output set of nodes for an atomic query and definition of a requirement relating to property values for at least one of the input and output sets of nodes for the query.

20. A system as claimed in claim 17 wherein the knowledge graph database comprises at least one matrix representing said knowledge graph, the database being responsive to a said query request from the query management logic to obtain result data for the atomic query via matrix-by-vector multiplication.

* * * * *